US012403955B2

(12) United States Patent
Luo

(10) Patent No.: US 12,403,955 B2
(45) Date of Patent: Sep. 2, 2025

(54) FOLDABLE TRAILER STEERING SYSTEM

(71) Applicant: Shenzhen Chepinyi Technology Co., Ltd., Guangdong (CN)

(72) Inventor: Haicheng Luo, Guangdong (CN)

(73) Assignee: Shenzhen Chepinyi Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/829,210

(22) Filed: Sep. 9, 2024

(65) Prior Publication Data

US 2024/0425111 A1 Dec. 26, 2024

Related U.S. Application Data

(63) Continuation-in-part of application No. 18/593,976, filed on Mar. 3, 2024, now Pat. No. 12,116,031, (Continued)

(30) Foreign Application Priority Data

Mar. 6, 2023 (CN) .......................... 202320389881.5
Nov. 28, 2023 (CN) .......................... 202323230532.8
(Continued)

(51) Int. Cl.
*B62D 13/04* (2006.01)
*B62D 63/06* (2006.01)

(52) U.S. Cl.
CPC ........... *B62D 13/04* (2013.01); *B62D 63/061* (2013.01)

(58) Field of Classification Search
CPC . B62D 13/04; B62B 2202/52; B62B 2205/06; B62B 3/02
See application file for complete search history.

(56) References Cited

U.S. PATENT DOCUMENTS 4,690,417 A * 9/1987 Betts .......................... B62B 3/02
280/42
10,640,135 B1 * 5/2020 Geffen ....................... B62B 3/02
(Continued)

FOREIGN PATENT DOCUMENTS

| CN | 107284491 A | * | 10/2017 | ......... B60B 33/0021 |
| CN | 115520253 A | * | 12/2022 | |
| WO | WO-2022121393 A1 | * | 6/2022 | |

OTHER PUBLICATIONS

Benlong Sun, Gathering and folding type hand buggy, Oct. 24, 2017, EPO, CN 107284491 A, English Abstract (Year: 2017).*
(Continued)

*Primary Examiner* — James A English

(57) ABSTRACT

Disclosed is a foldable trailer steering system, including a foldable frame. Either side of a bottom of one end of the foldable frame is rotatably connected to a steering wheel respectively, a steering structure is arranged between the two steering wheels, and the steering structure is foldably arranged. At least one end of the steering structure is rotatably connected to the corresponding steering wheel, the steering structure is connected to a steering rod assembly, and the steering rod assembly is configured for controlling movement of the steering structure. The steering structure is arranged between the two steering wheels, and the steering structure controls the rotation of the steering wheels. The steering structure is capable of switching states between an unfolded state and a folded state to adapt to the folding of the foldable frame. This structure enables the steering wheels to be replaced with straight-fork steering wheels.

19 Claims, 8 Drawing Sheets

Related U.S. Application Data which is a continuation of application No. PCT/CN2024/078680, filed on Feb. 27, 2024.

(30) Foreign Application Priority Data

Dec. 19, 2023 (CN) .......................... 202323480439.2
Jan. 11, 2024 (CN) .......................... 202420076798.7

(56) References Cited

U.S. PATENT DOCUMENTS

| 10,858,216 B1* | 12/2020 | Ward ................. B65H 75/2209 |
| 2018/0153755 A1* | 6/2018 | Kottmann ............... A61G 13/06 |
| 2021/0155276 A1* | 5/2021 | Sun ........................... B62B 1/12 |
| 2024/0010259 A1* | 1/2024 | Luo ......................... B62B 3/007 |

OTHER PUBLICATIONS

Benlong Sun, Gathering and folding type hand buggy, Oct. 24, 2017, EPO, CN 107284491 A, Machine Translation of Description (Year: 2017).*

* cited by examiner

FOLDABLE TRAILER STEERING SYSTEM

CROSS REFERENCE TO RELATED APPLICATIONS

The present application is a Continuation-In-Part Application of U.S. application Ser. No. 18/593,976 filed on Mar. 3, 2024, which is a Continuation Application of PCT Application No. PCT/CN2024/078680 filed on Feb. 27, 2024, which claims the benefit of Chinese Patent Application No. 202320389881.5 filed on Mar. 6, 2023. U.S. application Ser. No. 18/593,976 also claims the benefit of Chinese Patent Application Nos. 202420076798.7 filed on Jan. 11, 2024, 202323480439.2 filed on Dec. 19, 2023 and 202323230532.8 filed on Nov. 28, 2023. All the above are hereby incorporated by reference in their entirety.

TECHNICAL FIELD

The present disclosure relates to the technical field of trailers, and particularly relates to a foldable trailer steering system.

BACKGROUND

A foldable trailer is a foldable and trailable cargo carrier that is easy to use and store, and saves both time and labor in carrying things. The foldable trailer has been widely used for carrying things, and is usually applied to outdoor activities or short-distance transport at present.

At present, trailers, whether foldable or non-foldable, are usually provided with inclined-fork universal wheels for easy steering. The inclined-fork universal wheels with a special structural design (a wheel axis and a rotation axis are not on a same vertical line), are more convenient and labor-saving in steering than traditional straight-fork steering wheels (a wheel axis and a rotation axis are on a same vertical line). The inclined-fork universal wheels rotate in a force transmission direction. However, due to free steering, the inclined-fork universal wheels are controlled more difficultly than the straight-fork steering wheels, particularly on sloped surfaces with loads. In such cases, the inclined-fork universal wheel will rotate in a direction of a sliding force due to impact of the sliding force. To prevent a trailer from losing control, a user can only pull hard from an opposite direction, thereby causing inconvenience of use. Moreover, trailers are usually used outdoors. On a bumpy road, the inclined-fork universal wheels, due to free activity characteristics, are likely to be compressed by uneven surfaces and deviate from an original direction. Although the inclined-fork universal wheels can return to normal by applying a larger forward force, the forward force must be greater than various resistances generated to change an inclined state of the inclined-fork universal wheels caused by the compression, and the situation is more serious for sloped surfaces with heavy loads, thereby severely affecting the user's experience of using the trailer.

Therefore, it is urgent to design a foldable trailer steering system to overcome the above one or more defects in the prior art.

SUMMARY

The technical solution adopted by the present disclosure to solve its technical problems is as follows: a foldable trailer steering system is provided, including a foldable frame, where the foldable frame is a gathering-type frame; either side of a bottom of one end of the foldable frame is rotatably connected to a steering wheel respectively, a steering structure is arranged between the two steering wheels, and the steering structure can be vertically and foldably arranged for folding with the foldable frame; at least one end of the steering structure is rotatably connected to the corresponding steering wheel, and the steering structure is further connected to a steering rod assembly; one end of the foldable frame where the steering wheels are located is further rotatably connected to a support assembly, the support assembly is vertically folded with the foldable frame, the steering rod assembly is rotatably connected to the support assembly, and the steering rod assembly is capable of rotating vertically and horizontally relative to the support assembly; and the steering rod assembly controls the steering wheels to rotate horizontally through the steering structure, and when the foldable frame is folded, the support assembly drives the steering rod assembly to move vertically, and the steering rod assembly drives the steering structure to fold.

In a preferred embodiment, the steering structure includes a first connecting member, the first connecting member is rotatably connected to a swing steering arm, and the swing steering arm is fixedly connected to the steering rod assembly; and one end of the first connecting member away from one end of the swing steering arm is rotatably connected to a second connecting member, and the second connecting member is rotatably connected to the steering wheels.

In a preferred embodiment, the number of the steering structures is set as two, and the two steering structures are rotatably connected to the swing steering arms respectively.

In a preferred embodiment, one end of the second connecting member away from the first connecting member is rotatably connected to a third connecting member, and the third connecting member is rotatably connected to the corresponding steering wheels.

In a preferred embodiment, a distance from a lateral rotation axis of the steering rod assembly to a lateral rotation axis of the steering wheel on one side is defined as a first distance, and a distance from a connection point where the swing steering arm is connected to the corresponding first connecting member to a connection point where the steering wheel is connected to the corresponding second connecting member is defined as a second distance; and the first distance is greater than or less than the second distance.

In a preferred embodiment, a wheel swing arm is arranged above a side of either of the steering wheels, and the wheel swing arm is configured for connecting with the steering structure In a preferred embodiment, the other end of the foldable frame is provided with fixed wheels, the fixed wheels and/or the steering wheels are electrically driven to operate, and the steering rod assembly is capable of controlling the operation of the fixed wheels and/or the steering wheels; and the foldable frame is further provided with a power supply for providing power to the fixed wheels and/or the steering wheels and a controller, and the fixed wheels and/or the steering wheels are electrically connected to the controller.

In a preferred embodiment, one end of the foldable frame where the steering rod assembly is located is further provided with a pin-fixed clamping device configured for limiting the vertical rotation of the steering rod assembly.

In a preferred embodiment, the steering rod assembly includes a steering handle, the steering handle is capable of rotating vertically, and the steering handle can be in limiting fit with the steering rod assembly to limit the vertical rotation of the steering handle.

In a preferred embodiment, the support assembly includes a first support rod, a second support rod, a support rod connecting member, and an adapter rod, where one end of the first support rod is rotatably connected to the support rod connecting member, and one end of the second support rod is rotatably connected to one end of the support rod connecting member away from the first support rod; one end of the first support rod and one end of the second support rod that are away from each other are rotatably connected to the foldable frame, the first support rod and the second support rod are capable of rotating vertically relative to the foldable frame, the adapter rod is rotatably connected to the support rod connecting member, and the adapter rod is capable of rotating horizontally relative to the support rod connecting member; and the steering rod assembly is rotatably connected to the adapter rod, and the steering rod assembly is capable of rotating vertically relative to the adapter rod.

In a preferred embodiment, a rotation limiting device for limiting the vertical rotation of the steering rod assembly is arranged on the steering rod assembly.

In a preferred embodiment, an accelerating device and a braking device are arranged on the steering handle.

In a preferred embodiment, wheel limiting structures that are in inserted fit with each other are arranged on opposite sides of the two steering wheels respectively, and the wheel limiting structures are configured for limiting the horizontal rotation of the steering wheels after the foldable frame is folded.

In a preferred embodiment, either of the wheel limiting structure includes a limiting member and an inserting member, where the limiting member is arranged on one of the steering wheels, the inserting member is arranged on the other steering wheel, and the limiting member is opposite to the inserting member.

In a preferred embodiment, one end of the limiting member is shaped like a horn.

In a preferred embodiment, one end of the foldable frame that is connected to the steering wheels is provided with limiting structures configured for limiting a maximum rotation angle of the steering wheels.

In a preferred embodiment, both sides of one end of the foldable frame where the steering rod assembly is located are further rotatably connected to pedals.

In a preferred embodiment, the support assembly rotates on a vertical plane that is perpendicular to a length direction of the foldable frame and parallel to a width direction of the foldable frame.

In a preferred embodiment, a wheel swing arm is arranged above a side of either of the steering wheels, and the wheel swing arm is configured for connecting with the steering structure.

The present disclosure has the following beneficial effects: the steering structure is arranged between the two steering wheels, and the steering structure controls the rotation of the steering wheels. The steering structure is capable of switching states between an unfolded state and a folded state to adapt to the folding of the foldable frame. Controlled in a simple, convenient and practical manner, this structure enables the steering wheels to be replaced with straight-fork steering wheels, enhances the stability and safety of driving, and achieves simpler steering through a reasonable design. The present disclosure has a simple structure and is cost-effective.

Figure 1:
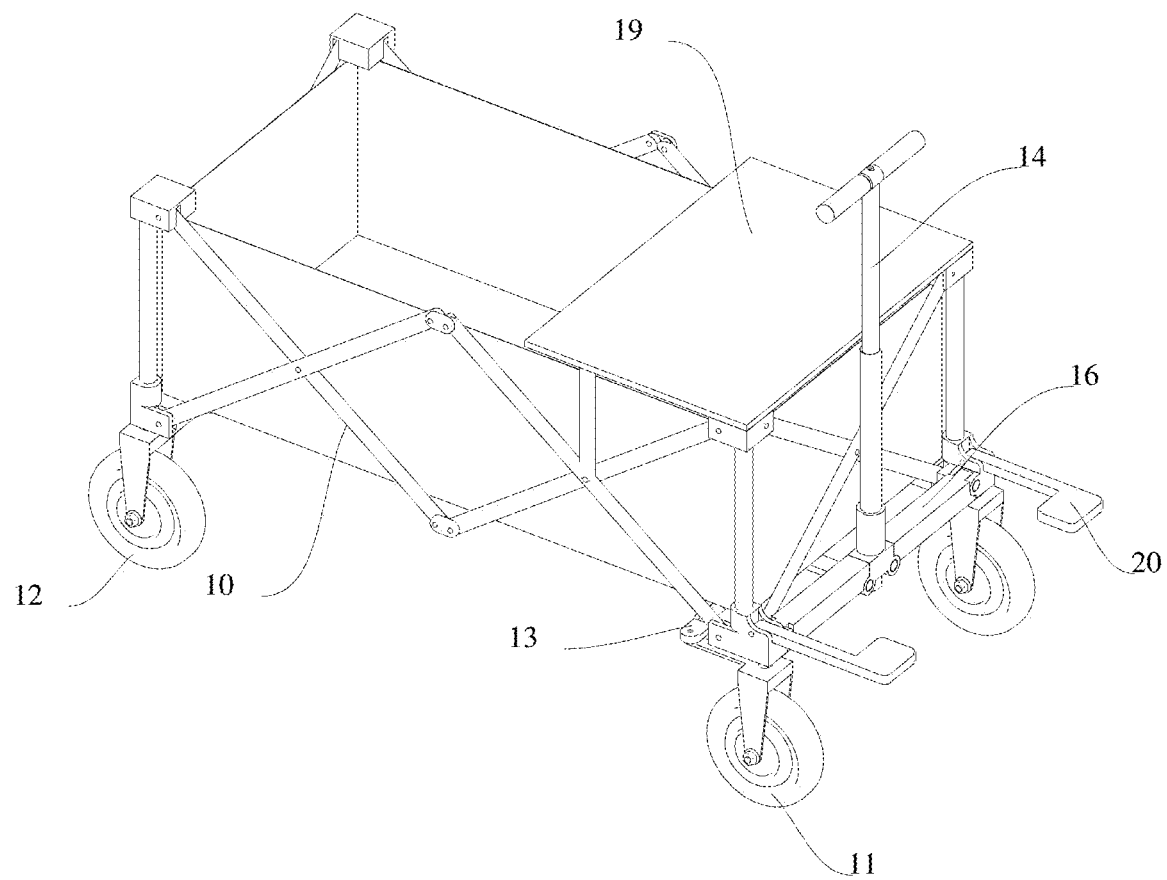
FIG. 1 is a structural schematic diagram of the present disclosure.

In the figures:
10. foldable frame; 101. pin-fixed clamping device; 11. steering wheel; 111. wheel swing arm; 12. fixed wheel; 13. steering structure; 131. first connecting member; 132. second connecting member; 133. third connecting member; 14. steering rod assembly; 141. steering handle; 15. rotation limiting device; 16. support assembly; 161. first support rod; 162. second support rod; 163. support rod connecting member; 164. adapter rod; 165. swing steering arm; 17. wheel limiting structure; 171. limiting member; 172. limiting member; 18. limiting structure; 19. seat device; and 20. pedal.

DETAILED DESCRIPTIONS OF THE EMBODIMENTS

In order to enable the objectives, features, and advantages mentioned above of the present disclosure to be more apparent and easily understood, specific implementations of the present disclosure will be described in detail below with reference to the drawings. Numerous specific details are set forth in the following description to facilitate a thorough understanding of the present disclosure. However, the present disclosure can be implemented in many other ways than those described herein, and those skilled in the art may make similar modifications without departing from the spirit of the present disclosure, and therefore the present disclosure is not to be limited by the specific embodiments disclosed below.

In the description of the examples of the present disclosure, it should be noted that, unless otherwise explicitly specified and defined, the terms "connection" and "mounting" should be understood in a broad sense. For example, "connection" may be a detachable connection, a non-detachable connection; and may be a direct connection, or an indirect connection via an intermediate medium. Further, "communication" may be a direct communication or an indirect communication via an intermediate medium. The term "fixed" refers to an interconnection where the relative positional relationship remains unchanged after the connection. The orientation terms mentioned in the present disclosure, such as "inside", "outside", "top", "bottom" and the like, only indicate the directions in the accompanying drawings. Therefore, the orientation terms are used to better illustrate and understand the embodiments of the present disclosure, and are not intended to indicate or imply that the referenced device or element must have a particular orientation and be constructed and operative in a particular orientation, and thus may not be construed as a limitation on the embodiments of the present disclosure.

In the embodiments of the present disclosure, the terms "first" and "second" are only used for descriptive purposes, and should not be construed as indicating or implying relative importance or implicitly indicating the number of technical features indicated. Thus, a feature defined with "first" and "second" may explicitly or implicitly include one or more of the features.

In the embodiments of the present disclosure, the term "and/or", which is merely an association relation describing an associated object, means that there may be three relations, for example, A and/or B may represent three situations: A exists alone, A and B exist at the same time, and B exists alone. In addition, the character "/" in the description generally indicates that successive association objects are in an "or" relation.

In the present specification, the description of reference terms such as "one embodiment" and "some embodiments" means that specific features, structures or characteristics described in combination with this embodiment are included in one or more embodiments of the present disclosure. Therefore, the statements appearing in different parts of the present specification, such as "in one embodiment", "in some embodiments", "in other embodiments", "in some other embodiments" and the like, do not necessarily refer to the same embodiment, but mean "one or more, but not all embodiments", unless otherwise specifically emphasized in any other way. The terms "including", "containing", "having" and any variations thereof mean "including but not limited to", unless otherwise specifically emphasized in any other way. Therefore, the present disclosure is not to be limited by the specific embodiments disclosed below.

As shown in FIGS. 1-8, the present disclosure provides a foldable trailer steering system. The foldable trailer steering system includes a foldable frame 10, and the foldable frame 10 is a gathering-type frame. Either side of a bottom of one end of the foldable frame 10 is rotatably connected to a steering wheel 11 respectively, a steering structure 13 is arranged between the two steering wheels 11, and the steering structure 13 can be vertically and foldably arranged for folding with the foldable frame 10. At least one end of the steering structure 13 is rotatably connected to the corresponding steering wheel 11, the steering structure 13 is further connected to a steering rod assembly 14, the steering rod assembly 14 is configured for controlling movement of the steering structure 13, and a seat device 19 is further arranged on a top of one end of the foldable frame 10 where the steering rod assembly 14 is located.

Specifically, the foldable frame 10 is a gathering-type frame, the gathering-type foldable frame 10 is a rectangular frame formed by enclosing foldable brackets in four directions (i.e., front, rear, left and right), and a foldable bracket is further arranged on a bottom surface of a middle portion of the frame. When folded, the bracket on the bottom surface of the middle portion of the frame arches upward and folds toward the middle from the four directions (i.e., front, rear, left and right), and the gathering-type foldable frame 10, after folding, occupies less space than that of any other type of foldable frame 10. Either side of the bottom of one end of the foldable frame 10 is rotatably connected to one of the steering wheels 11 respectively, and the steering wheels 11 are capable of rotating relative to the foldable frame 10 to change an orientation. The steering structure 13 is connected between the two steering wheels 11, the steering structure 13 is configured for controlling the two steering wheels 11 to rotate in a same direction when needed, and the steering structure 13 is foldably arranged, such that the steering structure 13 is capable of folding with the gathering of the foldable frame 10. The present disclosure prevents interference with the gathering and folding of the foldable frame 10, enables controllable rotation of the two steering wheels 11, and provides a foundation for manned riding. The seat device 19 arranged on the foldable frame 10 facilitates the manned riding, and orientations of the steering wheels 11 can be controlled to ensure a movement direction of a trailer and the safety of manned riding. For convenient control of the steering wheels 11, the steering rod assembly 14 is further arranged at one end of the foldable frame 10 where the steering wheels 11 are located, a bottom of the steering rod assembly 14 is connected to the steering structure 13, and the steering rod assembly 14 is capable of driving the steering structure 13 to move, so as to further drive the steering wheels 11 to rotate. During riding, a user can control an orientation of the steering wheels 11 through the steering rod assembly 14 to guide the movement direction of the trailer.

The steering structure 13 can be folded in a vertical or horizontal manner. The vertical folding is preferably folding in an upward arching manner, and the horizontal folding is preferably folding in a length direction of the foldable frame 10. Specifically, a middle portion of the steering structure 13 moves towards a front or a rear of the foldable frame 10, and both ends of the steering structure 13 move closer to each other to form an inverted "V" or "W" shape. In this manner, the steering structure 13 and the steering rod assembly 14 are detachably connected, which can be disconnected when folding is needed and reconnected when folding is not needed. In the present disclosure, the vertical folding is preferred because a structure is simplified, and frequent disconnection between the steering structure 13 and the steering rod assembly 14 is not required, thereby ensuring structural stability.

Further, the steering structure 13 includes a first connecting member 131, the first connecting member 131 is connected to a swing steering arm 165, and the swing steering arm 165 is fixedly connected to the steering rod assembly 14; and at least one end of the first connecting member 131 is rotatably connected to a second connecting member 132, and the second connecting member 132 is rotatably connected to the steering wheels 11.

Specifically, the steering structure 13 includes the first connecting member 131, one end of the first connecting member 131 is connected to the swing steering arm 165, and the other end of the first connecting member 131 is connected to the second connecting member 132. The second connecting member 132 is rotatably connected to the steering wheels 11. In order to achieve folding and control horizontal rotation of the steering wheels 11, the first connecting member 131 needs to be capable of rotating horizontally and vertically relative to the swing steering arm 165. To meet the requirement, a connecting member capable of moving in a plurality of directions such as a fisheye bearing or a universal joint connector is preferably used for a connection between the first connecting member 131 and the swing steering arm 165, or an adaptor that is capable of substituting the first connecting member 131 to connect the swing steering arm 165 and moving in one of the directions is also preferred, such that the first connecting member 131 is capable of rotating horizontally and vertically relative to the swing steering arm 165. Horizontal rotation is used to control the horizontal rotation of the steering wheels 11, and vertical rotation is used for folding the steering structure 13. In this technical solution, the steering structure 13 can be located between the steering rod assembly 14 and one of the steering wheels 11, i.e., the steering rod assembly 14 is capable of controlling a movement direction of the foldable frame 10 by only controlling the horizontal rotation of one of the steering wheels 11.

Further, the number of the steering structures 13 is set as two, and the two steering structures 13 are rotatably connected to the swing steering arms 165 respectively.

Specifically, in this embodiment, the number of the steering structures 13 is preferably set as two, and one end of either of the steering structures 13 is rotatably connected to the corresponding swing steering arm 165 respectively. The two steering structures 13 are capable of rotating horizontally and vertically relative to the swing steering arm 165. One end of either of the two steering structures 13 away from the swing steering arm 165 is rotatably connected to the corresponding steering wheel 11. The steering rod assembly 14 controls the horizontal rotation of the two steering wheels 11 by controlling the movement of the two steering structures 13.

Further, one end of the second connecting member 132 away from the first connecting member 131 is rotatably connected to a third connecting member 133, and the third connecting member 133 is rotatably connected to the corresponding steering wheels 11.

Specifically, in other technical schemes, the steering structure 13 further includes the third connecting members 133, the first connecting member 131 is connected to the swing steering arm 165, the swing steering arm 165 is rotatably connected to the first connecting member 131, the swing steering arm 165 is capable of rotating horizontally relative to the first connecting member 131, and one end of the swing steering arm 165, away from the other end connected to the first connecting member 131, is fixedly connected to a bottom end of the steering rod assembly 14; either of the second connecting members 132 is located at one end of the first connecting member 131 away from the swing steering arm 165 and is rotatably connected to the first connecting member 131 respectively, and the second connecting members 132 are capable of rotating vertically relative to the first connecting member 131; the third connecting members 133 are located at ends of the second connecting members 132 away from the first connecting member 131 respectively, and are rotatably connected to the second connecting members 132, and the second connecting members 132 are capable of rotating vertically relative to the third connecting members 133; one end of either of the third connecting members 133 that is away from the corresponding second connecting member 132 is rotatably connected to the corresponding steering wheel 11, and the third connecting members 133 are capable of rotating horizontally relative to the steering wheels 11; when the steering rod assembly 14 rotates, the swing steering arm 165 is driven to swing left and right, the swing steering arm 165 drives the first connecting member 131 connected thereto to move left and right, the first connecting member 131 drives the second connecting members 132 and the third connecting members 133 to move, and the third connecting members 133, under the action of an applied force, drives the steering wheels 11 to rotate, such that an effect of steering control is achieved; further, the steering structure 13 in this technical solution can also be arranged between the steering rod assembly 14 and the steering wheel 11 only on one side; the movement direction of the entire foldable frame 10 can be controlled by only controlling the horizontal rotation of one of the steering wheels 11; and according to this technical solution, the second connecting member 132 is connected to the swing steering arm 165 through the first connecting member 131, such that through the first connecting member 131, the horizontal rotation of the second connecting member 132 relative to the swing steering arm 165 can be achieved, which can substitute a way of using the fisheye bearing or the universal joint connector.

When the foldable frame 10 is folded, a support assembly 16 is compressed, and the support assembly 16 drives the steering rod assembly 14 to move upward; the steering rod assembly 14 drives the first connecting member 131 to move upward, and the first connecting member 131, when moving upward, drives the second connecting member 132 to incline; when the foldable frame 10 is folded to a limit position and the steering structures are arranged on one side, the first connecting member 131, the second connecting member 132, and the third connecting member 133 form a "Z" shape; when the steering structures are arranged on both sides, the first connecting member 131, the second connecting member 132, and the third connecting member 133 form an inverted "U" shape; and in this manner, the steering structure 13 does not interfere with the folding of the foldable frame 10, still maintains a volume of the foldable frame 10 after the folding of the foldable frame 10, and also enables the control over the movement direction of the trailer, which overcomes the defects of a gathering-type frame in the prior art including failure to achieve folding and stably control the movement direction.

It should be noted that when the above steering structure controls only one of the steering wheels, the other steering wheel needs to be a follow-up universal wheel to avoid the problem of difficult steering.

Further, a wheel swing arm 111 is arranged above a side of either of the steering wheels 11 that corresponds to the steering structure 13 in a manner of extending outward, and the wheel swing arm 111 is configured for rotatably connecting with the steering structure 13.

Specifically, on the basis of the above technical solution, to facilitate smoother rotation of the steering wheels 11 and to achieve more rational structural arrangement, the wheel swing arm 111 is further arranged above the side of either of the steering wheels 11 that corresponds to the steering structure 13 in a manner of extending outward, and the second connecting member 132 or the third connecting member 133 is rotatably connected to the corresponding wheel swing arm 111. When the second connecting member 132 or the third connecting member 133 is driven to move, the corresponding steering wheel 11 is pushed or pulled to rotate through the wheel swing arm 111. Through arrangement of the wheel swing arm 111, a distance between the second connecting member 132 or the third connecting member 133 and a lateral rotation axis of the corresponding steering wheel 11 is extended. In this case, a length of the swing steering arm 165 is adjusted accordingly, such that a position of the steering structure 13 is more reasonable, which avoids spatial conflicts with other structures, and allows easier pushing of the steering wheels 11 while ensuring a larger rotation angle for the steering wheels 11.

Further, a distance from a lateral rotation axis of the steering rod assembly 14 to a lateral rotation axis of the steering wheel 11 on one side is defined as a first distance, and a distance from a connection point where the swing steering arm 165 is connected to the corresponding first connecting member 131 to a connection point where the steering wheel 11 is connected to the corresponding second connecting member 132 is defined as a second distance. The first distance is greater than or less than the second distance.

Specifically, steering angles of the two steering wheels 11 of a trailer in the prior art are consistent. In this case, during a turn, inner wheels and outer wheels are in a state of sliding on the ground rather than in a pure rolling state, which leads to wear of wheel tires and even serious abrasion of wheel tires over time. Furthermore, the trailer in the prior art is also prone to rollover during a turn. To avoid occurrence of this situation, in the present disclosure, the distance from the lateral rotation axis of the steering rod assembly 14 to the lateral rotation axis of the steering wheel 11 on one side is set to be greater than or less than a distance from the connection point where the swing steering arm 165 is connected to the corresponding first connecting member 131 to a connection point where the wheel swing arm 111 is connected to the corresponding third connecting member 133 on a same side. For the convenience of description, the distance from the lateral rotation axis of the steering rod assembly 14 to the lateral rotation axis of the steering wheel 11 on one side is defined as the first distance, and the distance from the connection point where the swing steering arm 165 is connected to the corresponding first connecting member 131 to a connection point where the wheel swing arm 111 is connected to the corresponding third connecting member 133 is defined as the second distance. To avoid tire wear and improve turning stability, the first distance and the second distance need to be unequal. In this case, turning angles of the two steering wheels 11 will be inconsistent in the turning process, with one larger angle and one smaller angle, that is, a turning radius of the inner wheels is smaller than that of the outer wheels, which conforms to a working principle of an Ackermann steering system, such that the inner wheels maintain the pure rolling state, thereby avoiding tire wear and enhancing turning stability.

When the first distance is greater than the second distance, a better effect of the Ackermann steering system can be achieved, and when the first distance is less than the second distance, the effect of the Ackermann steering system can also be achieved, but is inferior to the effect achieved when the first distance is greater than the second distance.

Figure 5:
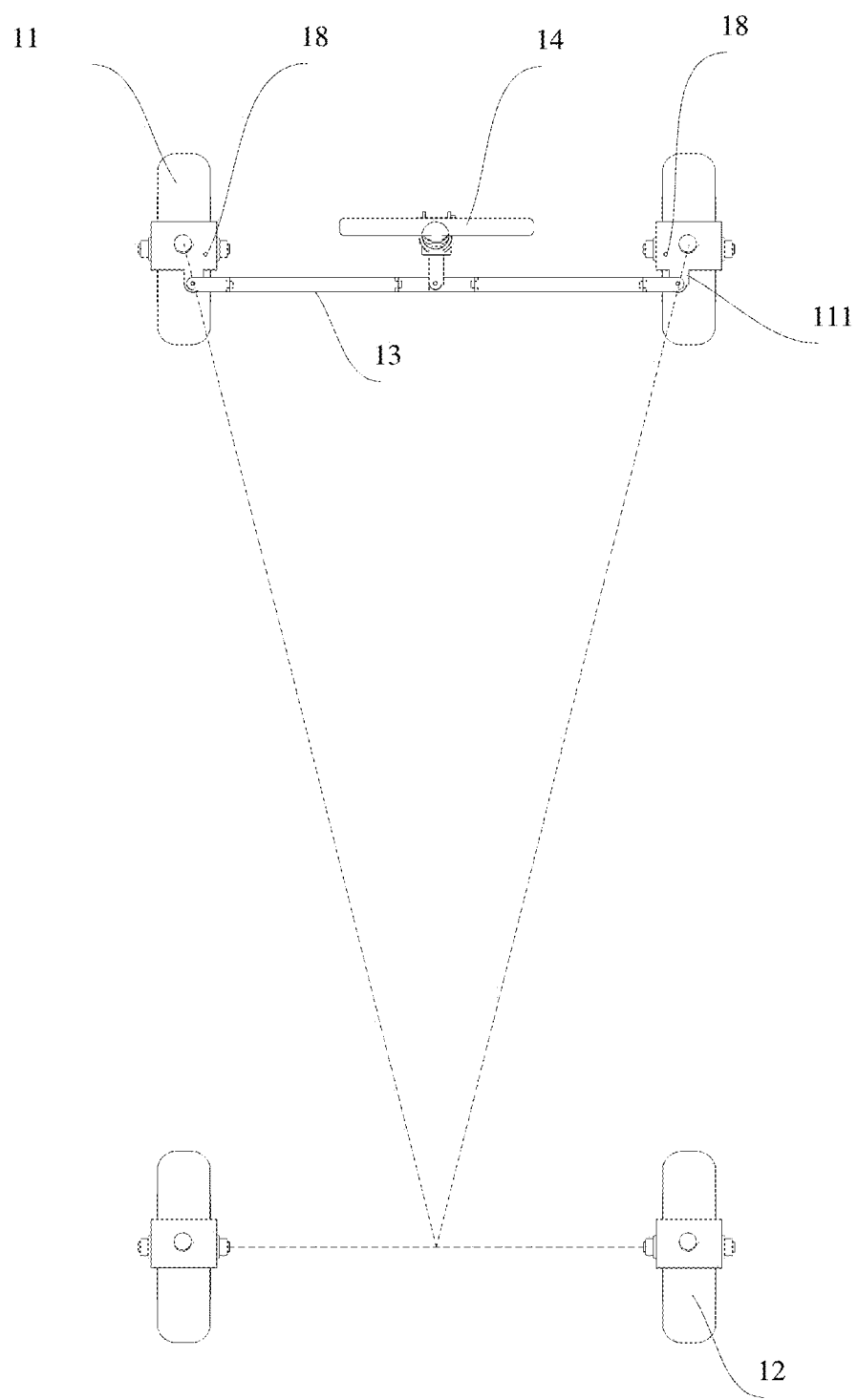
FIG. 5 is a schematic diagram of a first implementation of Ackermann steering of the present disclosure.

Implementation scheme: in a first aspect, as illustrated in FIG. 5, the wheel swing arms 111 are not located on a center parting line of the wheels, and are preferably located within opposite sides of the two steering wheels 11. In this case, a distance between the two wheel swing arms 111 is less than a distance between lateral rotation axes of the two steering wheels 11. Further preferably, a connection point between one of the wheel swing arms 111 and the steering structure 13 is located on a straight line from a lateral axis of the steering wheels 11 to a center of a spacing between two rear wheels of the trailer. In this manner, an effect of positive Ackermann steering can be fully achieved.

Figure 6:
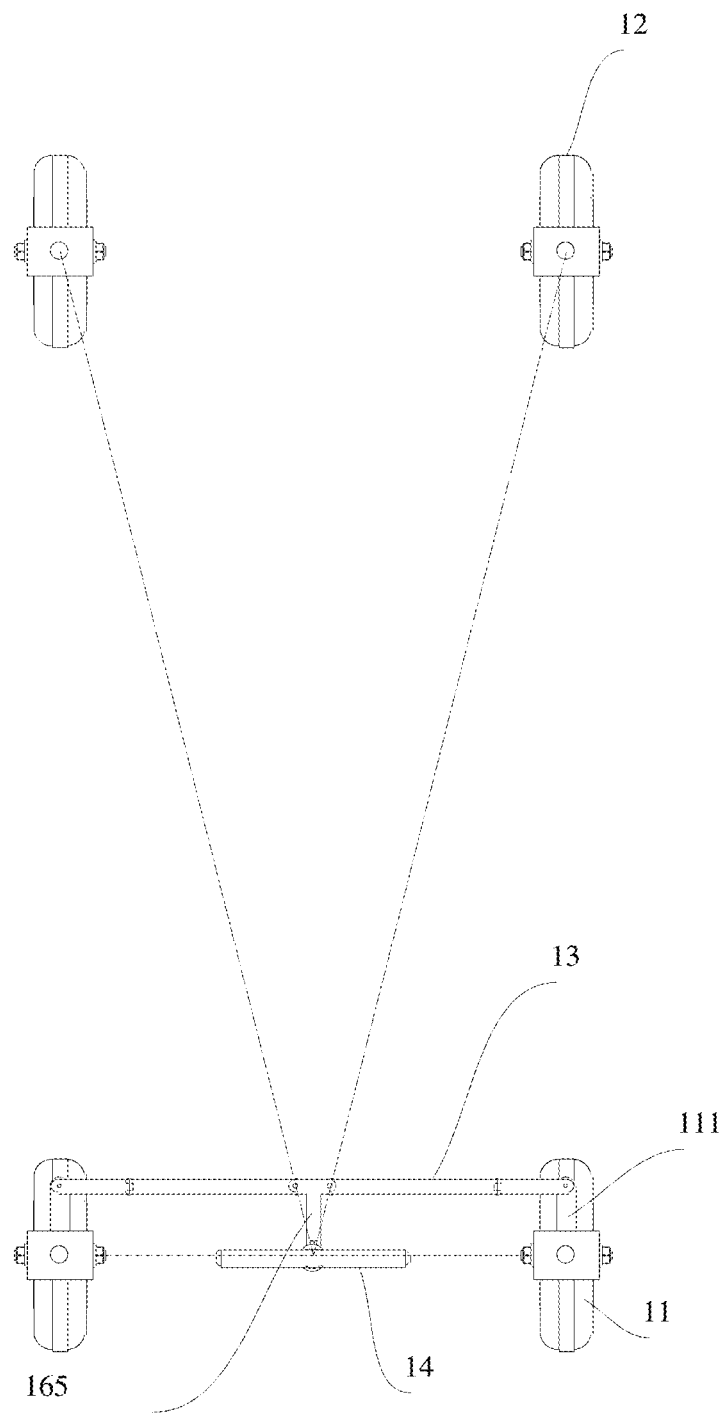
FIG. 6 is a schematic diagram of a second implementation of Ackermann steering of the present disclosure.

In a second aspect, as illustrated in FIG. 6, the wheel swing arms 111 are located on the center parting line of the wheels, the swing steering arm 165 is T-shaped, the steering structure 13 is connected to the swing steering arm 165 through a vertical shaft, the steering structure 13 is capable of rotating vertically relative to the vertical shaft, and the swing steering arm 165 is capable of rotating horizontally relative to the vertical shaft. In this manner, a connection point between the swing steering arm 165 and the steering structure 13 is preferably located on a straight line from an axis of the two rear wheels to a center of a spacing between the two steering wheels 11. In this manner, the effect of positive Ackermann steering can also be fully achieved.

Further, in this embodiment, the other end of the foldable frame 10 is provided with fixed wheels 12, the fixed wheels 12 and/or the steering wheels 11 are electrically driven to operate, and the steering rod assembly 14 is capable of controlling the operation of the fixed wheels 12 and/or the steering wheels 11. The foldable frame 10 is further provided with a power supply (not shown in the figure) for providing power to the fixed wheels 12 and/or the steering wheels 11 and a controller (not shown in the figure), and the fixed wheels 12 and/or the steering wheels 11 are electrically connected to the controller.

Specifically, the fixed wheels 12 are further arranged at one end of the foldable frame 10 away from the other end where the steering wheels 11 are located, and an orientation of the fixed wheels 12 is fixed and remains unchanged, to ensure safety during riding. The fixed wheels 12 and/or the steering wheels 11 are wheels that are electrically driven to operate. In this embodiment, the foldable frame 10 is the gathering-type frame, and therefore a wheel hub motor is preferred. The foldable frame 10 is further provided with the power supply and the controller, where the power supply provides power to the wheel hub motor, and the controller is configured for controlling the operation of the wheel hub motor, such that the foldable frame 10 has power for continued riding, thereby enhancing the convenience of using the trailer. For ease of operation, the steering rod assembly 14 is electrically connected to the controller, and the steering rod assembly 14 is capable of controlling the operation of the wheel hub motor, thereby facilitating operation during riding.

The wheel hub motor is selected based on actual use needs. For example, when the wheel hub motor is selected for the fixed wheels 12 to apply a rear-wheel driving force, the phenomenon of slipping on slippery or soft road surfaces can be effectively reduced, but the obstacle-crossing capability is poor. When the wheel hub motor is selected for the steering wheels 11 to apply a front-wheel driving force, stronger obstacle-crossing ability is available, but the phenomenon of slipping is more likely to occur. When the wheel hub motor is selected for both the fixed wheels 12 and the steering wheels 11, not only advantages of both the front-wheel drive and the rear-wheel drive are available, but also disadvantages of the front-wheel drive and the rear-wheel drive can be overcome, but costs are high. Therefore, the wheel hub motor should be selected based on actual use needs.

It should be noted that due to the arrangement of the steering structure 13, the steering wheels 11 can be connected through the steering structure 13, and are driven by the steering structure 13 to rotate. Therefore, the steering wheels 11 can be straight-fork steering wheels, which, compared to inclined-fork universal wheels, enable more stability during movement, but cannot rotate freely and can rotate only when subjected to a force applied by the steering structure 13. Therefore, safety of use is enhanced, and under heavy loads, straight-fork steering wheels allow simpler steering.

Further, in this embodiment, the steering rod assembly 14 is movably connected to the foldable frame 10, and the steering rod assembly 14 is capable of rotating vertically and horizontally relative to the foldable frame 10.

Figure 2:
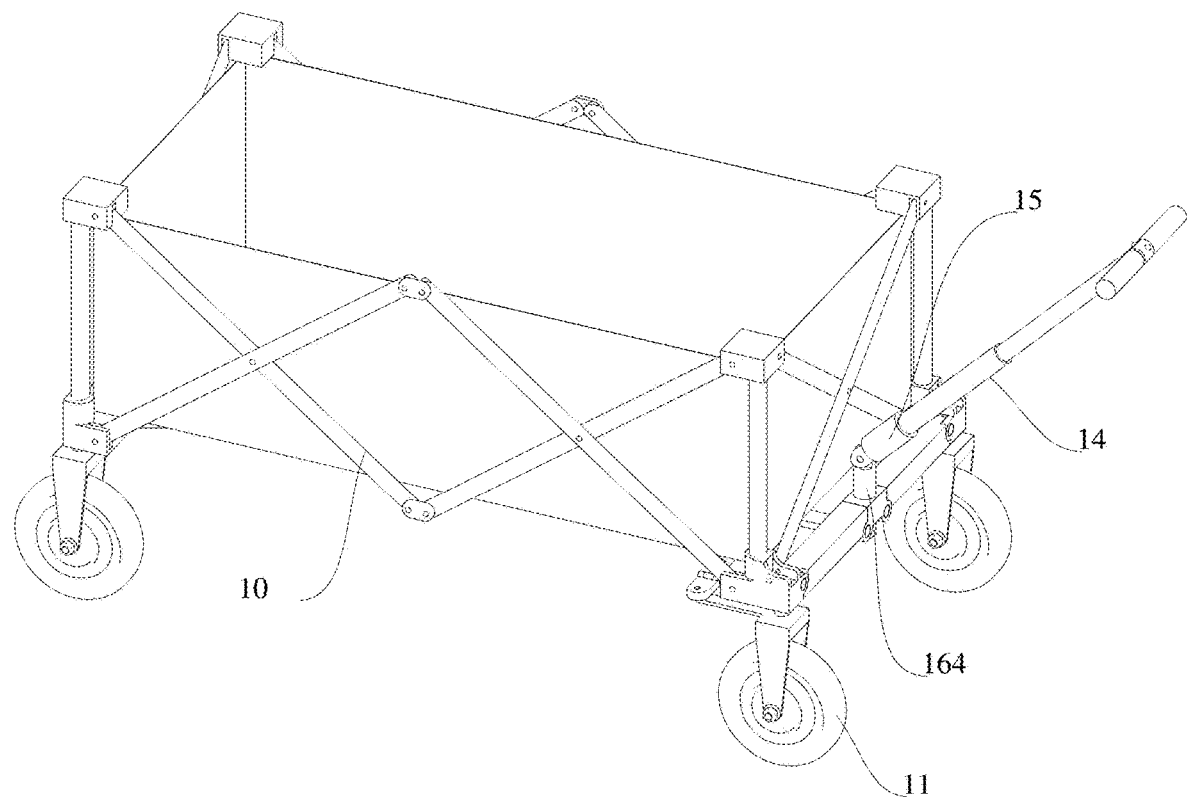
FIG. 2 is a schematic diagram of the present disclosure in a trailing state.
Figure 3:
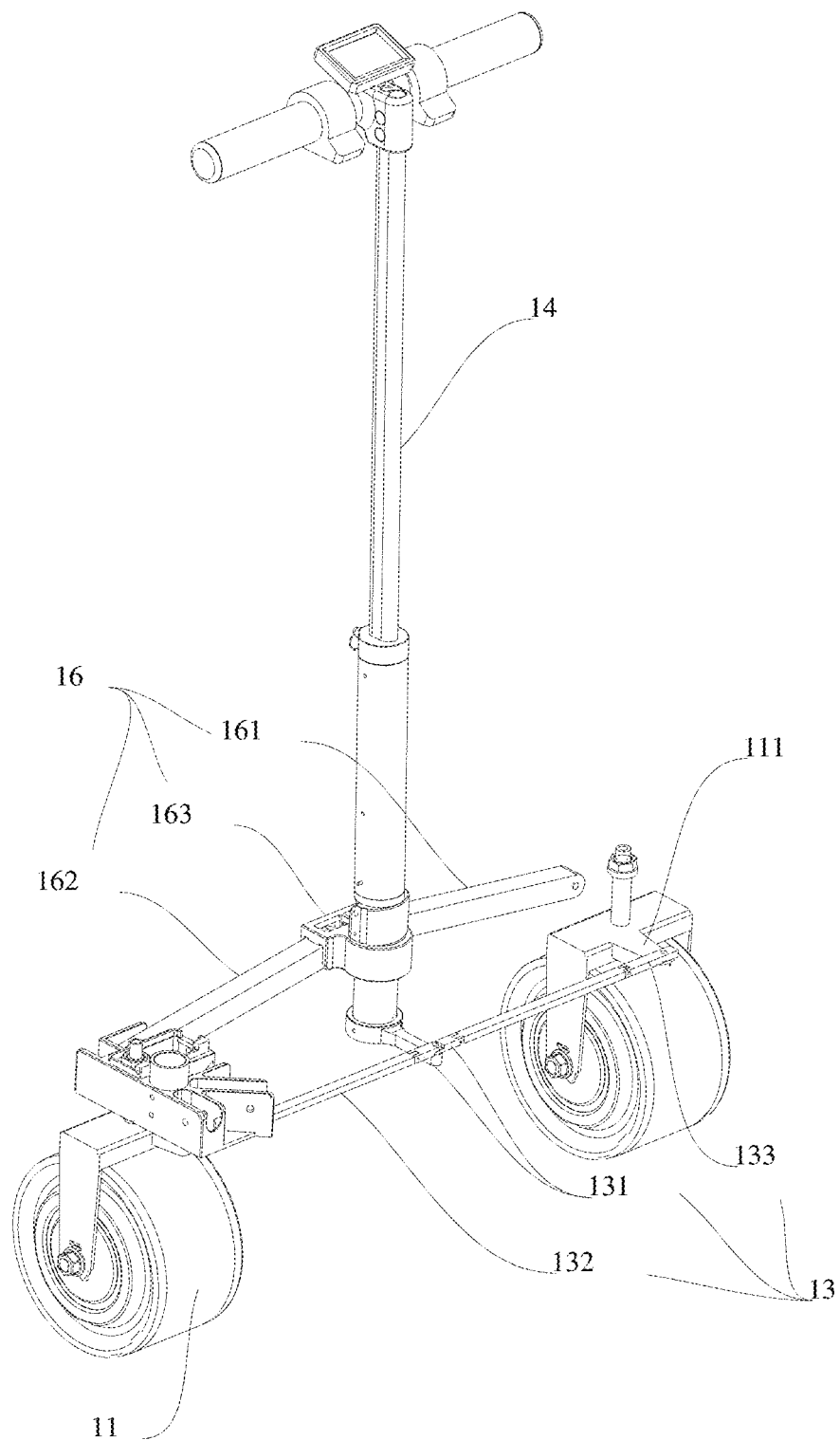
FIG. 3 is a structural schematic diagram of a steering structure and a steering rod assembly of the present disclosure.
Figure 4:
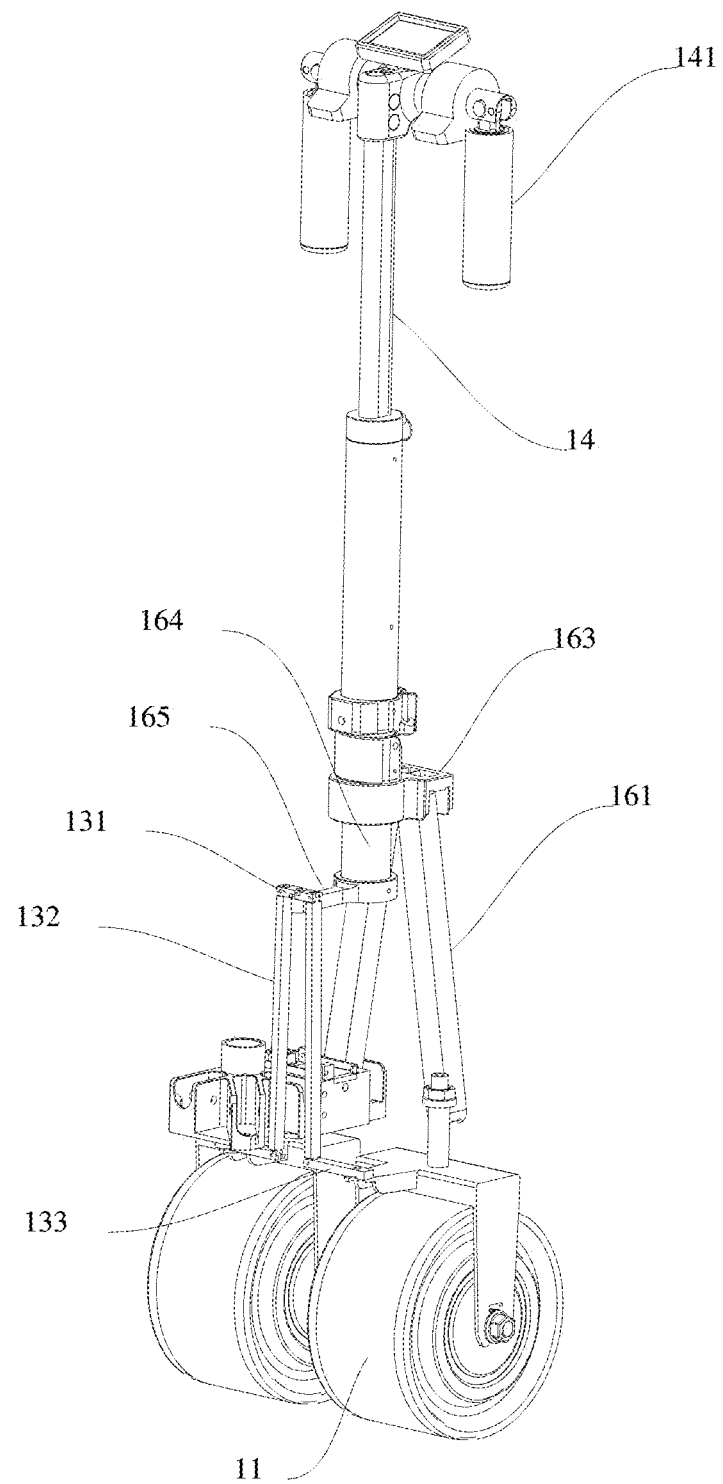
FIG. 4 is a schematic diagram of changes when a steering structure of the present disclosure is folded.

Specifically, to use the trailer in various modes, the steering rod assembly 14 is movably connected to the foldable frame 10, and the steering rod assembly 14 is capable of rotating vertically and horizontally relative to the foldable frame 10. Horizontal rotation facilitates steering control during riding, and vertical rotation is needed for trailing, as illustrated in FIG. 2. Adjustment can be made according to different use needs.

Further, one end of the foldable frame 10 where the steering rod assembly 14 is located is further provided with a pin-fixed clamping device 101 configured for limiting the vertical rotation of the steering rod assembly 14.

Specifically, since the steering rod assembly 14 is capable of rotating vertically, the pin-fixed clamping device 101 can be arranged at the end of the foldable frame 10 where the steering rod assembly 14 is provided to eliminate the need of manually keeping the steering rod assembly 14 in a vertical state when riding. The steering rod assembly 14 can be placed in the pin-fixed clamping device 101 to limit the vertical rotation of the steering rod assembly 14. To prevent the steering rod assembly 14 from detaching from the pin-fixed clamping device 101 under the action of an external force, the pin-fixed clamping device 101 preferably includes a detachable clamping bolt. The clamping bolt fully limits the steering rod assembly 14 in the pin-fixed clamping device 101, and prevents detachment from the pin-fixed clamping device 101 even under the action of an external force, thereby ensuring stability of the steering rod assembly 14 during riding and enhancing safety of riding.

Further, a rotation limiting device 15 for limiting the vertical rotation of the steering rod assembly 14 is arranged on the steering rod assembly 14.

Specifically, in another embodiment, as illustrated in FIG. 2, a structure that limits the vertical rotation of the steering rod assembly 14 is located on the steering rod assembly 14, i.e., the rotation limiting device 15 is movably arranged on an outer side of a structural member that drives the vertical rotation of the steering rod assembly 14. The rotation limiting device 15 is preferably a sliding sleeve that is capable of moving along the steering rod assembly 14. In the riding process, the sliding sleeve can be moved to cover the structure that limits the vertical rotation of the steering rod assembly 14, and the sliding sleeve is used to limit the rotation of the steering rod assembly 14.

Further, in this embodiment, one end of the foldable frame 10 where the steering wheels 11 are located is further rotatably connected to a support assembly 16, the support assembly 16 is vertically folded with the foldable frame 10, the steering rod assembly 14 is rotatably connected to the support assembly 16, and the steering rod assembly 14 is capable of rotating vertically relative to the support assembly 16.

Specifically, one end of the foldable frame 10 where the steering wheels 11 are located is further rotatably connected to the support assembly 16, and the support assembly 16 is configured for supporting the steering rod assembly 14. To prevent the support assembly 16 from hindering the folding of the foldable frame 10, the support assembly 16 is rotatably connected to the foldable frame 10, and is capable of folding with the folding of the foldable frame 10.

Further, the support assembly 16 includes a first support rod 161, a second support rod 162, a support rod connecting member 163, and an adapter rod 164, where one end of the first support rod 161 is rotatably connected to the support rod connecting member 163, and one end of the second support rod 162 is rotatably connected to one end of the support rod connecting member 163 away from the first support rod 161; one end of the first support rod 161 and one end of the second support rod 162 that are away from each other are rotatably connected to the foldable frame 10, the first support rod 161 and the second support rod 162 are capable of rotating vertically relative to the foldable frame 10, the adapter rod 164 is rotatably connected to the support rod connecting member 163, and the adapter rod 164 is capable of rotating horizontally relative to the support rod connecting member 163; and the steering rod assembly 14 is rotatably connected to the adapter rod 164, and the steering rod assembly 14 is capable of rotating vertically relative to the adapter rod 164.

Specifically, the support assembly 16 includes the first support rod 161, the second support rod 162, and the support rod connecting member 163, where the first support rod 161 and the second support rod 162 are rotatably connected to corresponding sides of the foldable frame 10, the support rod connecting member 163 is located between the first support rod 161 and the second support rod 162, and corresponding ends of the first support rod 161 and the second support rod 162 that are away from the foldable frame 10 are rotatably connected to the support rod connecting member 163; the first support rod 161 and the second support rod 162 are capable of rotating vertically relative to the support rod connecting member 163, the support rod connecting member 163 is connected to the adapter rod 164 through a steering bearing, and the adapter rod 164 is capable of rotating horizontally relative to the support rod connecting member 163; the steering rod assembly 14 is rotatably connected to the adapter rod 164, and the steering rod assembly 14 is capable of rotating vertically relative to the adapter rod 164 and horizontally rotating relative to the foldable frame 10 through the adapter rod 164; and one end of the swing steering arm 165 away from the steering structure 13 is fixedly connected to the adapter rod 164, such that when the steering rod assembly 14 rotates horizontally, the adapter rod 164 drives the swing steering arm 165 to swing and then drives the steering structure 13 to move.

Preferably, the first support rod 161, the second support rod 162 and the support rod connecting member 163 are not aligned along a horizontal line, such that the support assembly 16 is in an arched shape, and the support assembly 16 can be compressed automatically with the folding of the foldable frame 10 without need of an external force, thereby enhancing the convenience of folding the trailer.

Further, the support assembly 16 rotates on a vertical plane that is perpendicular to a length direction of the foldable frame 10 and parallel to a width direction of the foldable frame 10.

Specifically, in this embodiment, the support assembly 16 is limited to vertically rotate on the vertical plane that is perpendicular to the length direction of the foldable frame 10 and parallel to the width direction of the foldable frame 10, such that when the support assembly 16 rotates, the steering rod assembly 14 can be driven to move only upward or downward as a whole, thereby avoiding the need to arrange a structure on the support assembly 16 for limiting the support assembly 14 to rotate in other directions.

Further, the steering rod assembly 14 includes a steering handle 141, the steering handle 141 is capable of rotating vertically, and the steering handle 141 can be in limiting fit with the steering rod assembly 14 to limit the vertical rotation of the steering handle 141.

Specifically, the steering rod assembly 14 includes the steering handle 141, and the steering handle 141 is capable of rotating vertically, such that the steering handle 141 can be folded with the folding of the foldable frame 10, which prevents the steering handle 141 from extending excessively, cooperates with the folding of the foldable frame 10, and reduces an overall volume of the trailer after the folding. A rotation limiting button (not shown in the figure) is further arranged on the steering rod assembly 14, and the rotation limiting button is configured for controlling the vertical rotation of the steering handle 141, such that the steering handle 141 remains in a horizontal state when folding is not needed, and when folding is required, the rotation limiting button can be pressed to release the limitation on the steering handle 141, or the steering handle 141 can also be limited to remain in the horizontal state by connecting the steering handle 141 with the steering rod assembly 14 in a sleeved manner.

Further, in this embodiment, an accelerating device (not shown in the figure) and a braking device (not shown in the figure) are arranged on the steering handle 141.

Specifically, the accelerating device and the braking device are further arranged on the steering handle 141, where the accelerating device can be an electric switch handle or a thumb shifter for controlling the acceleration of the wheel hub motor, and the braking device can be a brake handle or an electronic brake for deceleration and braking.

Figure 7:
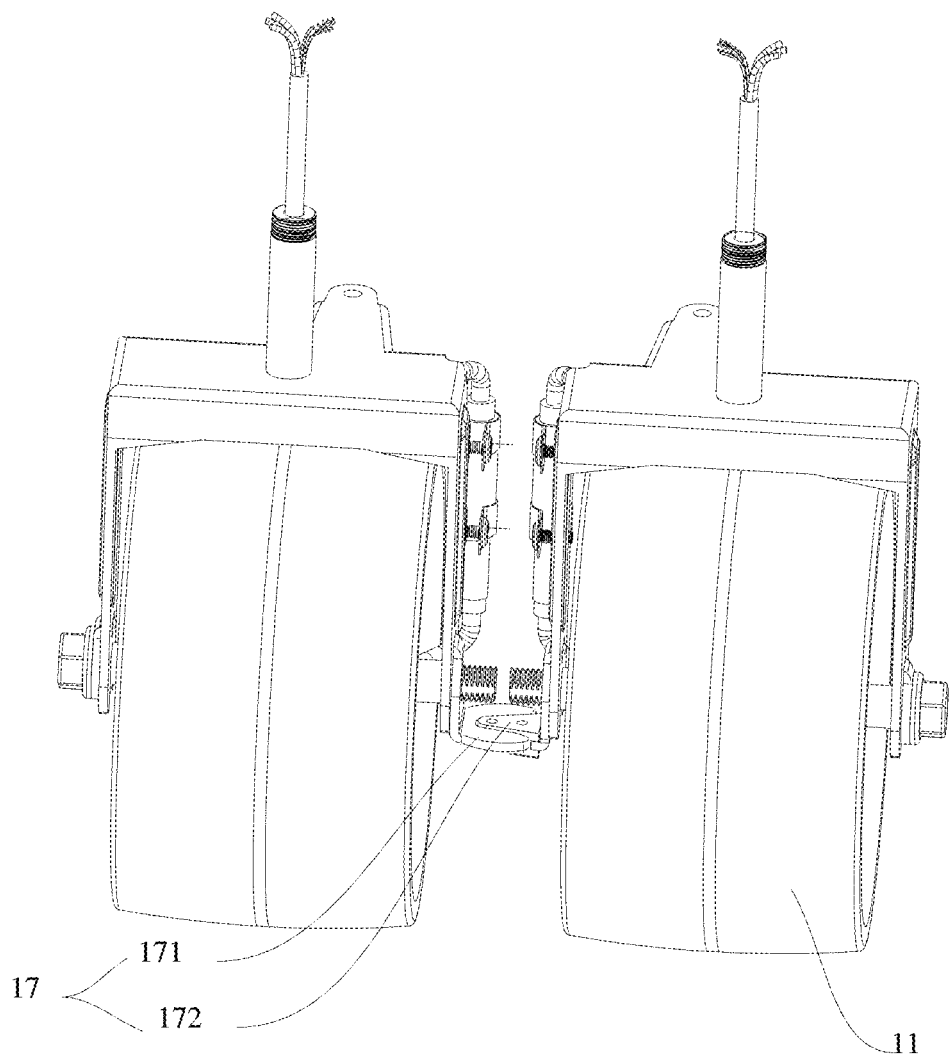
FIG. 7 is a sectional view of a wheel limiting structure of the present disclosure.
Figure 8:
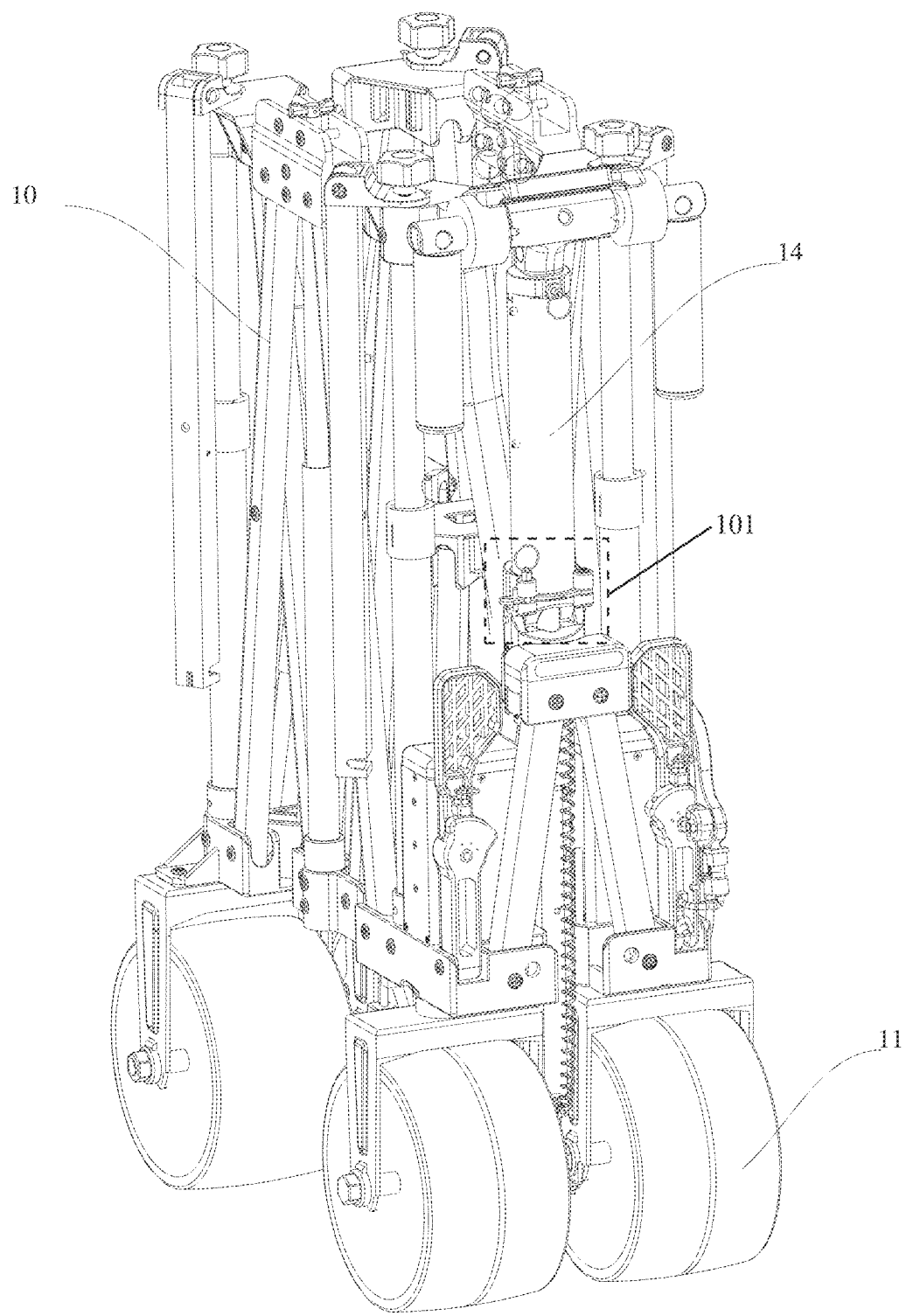
FIG. 8 is a schematic diagram of the present disclosure in a folding state.

Further, as illustrated in FIG. 7, wheel limiting structures 17 that are in inserted fit with each other are arranged on opposite sides of the two steering wheels 11 respectively, and the wheel limiting structures 17 are configured for limiting the horizontal rotation of the steering wheels 11 after the foldable frame 10 is folded.

Specifically, in the prior art, when the foldable frame 10 is folded, the steering wheels 11 do not have a limiting function, such that the steering wheels 11 will rotate horizontally with movement of the foldable frame. In this case, although the steering structure 13 is capable of limiting excessive rotation of the steering wheels 11 to some extent, complete limiting is impossible, and rotation of the steering wheels 11 drives the steering structure 13 to move. Such movement occurs after the folding, and easily damages the steering structure 13. To avoid occurrence of this situation, the wheel limiting structures 17 that match each other are arranged on the two steering wheels 11 connected to the steering structure 13 respectively. When the two steering wheels 11 move closer to each other, the wheel limiting structures 17 will engage, and the wheel limiting structures 17 limit the horizontal rotation of the steering wheels 11 after the folding to protect the steering structure 13 from damage.

Further, either of the wheel limiting structure 17 includes a limiting member 171 and an inserting member 172, where the limiting member 171 is arranged on one of the steering wheels 11, the inserting member 172 is arranged on the other steering wheel 11, and the limiting member 171 is opposite to the inserting member 172.

Specifically, the limiting member 171 is fixed or rotatably limited on one of the steering wheels 11, and the inserting member 172 is fixed or rotatably limited on the other steering wheel 11. When the two steering wheels 11 move closer to each other, the inserting member 172 is inserted into the limiting member 171, thereby limiting the horizontal rotation of the two steering wheels 11 through the cooperation between the limiting member 171 and the inserting member 172. Further, the folded frame is secured with a binding strap to ensure that the limiting member 171 and the inserting member 172 on the steering wheels 11 remain tightly engaged and are not disengaged. Further, the purpose of trailing can be achieved through the cooperation between the limiting member 171 and the inserting member 172, which increases convenience of use.

Further, one end of the limiting member 171 is shaped like a horn.

Specifically, to enhance the smoothness of matching between the limiting member 171 and the inserting member 172, one end of the limiting member 171 that faces the inserting member 172 is designed to be shaped like a horn. This design facilitates the insertion of the inserting member 172 into the limiting member 171.

Further, in this embodiment, one end of the foldable frame 10 that is connected to the steering wheels 11 is provided with limiting structures 18 configured for limiting a maximum rotation angle of the steering wheels 11.

Specifically, to prevent the two steering wheels 11 from failing to return smoothly after rotating to the maximum rotation angle under the driving action of steering arms, the limiting structures 18 are further arranged on a bottom surface of a supporting base of the frame or on the steering wheels 11. The limiting structure 18 cooperate with the steering arms or the swing steering arms 165 to limit the continued rotation of the steering wheels 11 after rotating to a certain angle, so as to avoid the situation where the steering wheels 11 cannot return due to excessive rotation.

Further, both sides of one end of the foldable frame 10 where the steering rod assembly 14 is located are further rotatably connected to pedals 20.

Specifically, to optimize user experience, both sides of one end of the foldable frame 10 where the steering rod assembly 14 is located are further rotatably connected to the pedals 20, and the foot pedals 20 are arranged on both sides of a bottom of the foldable frame 10. When in use, the foot pedals 20 can be spread flatly, such that a user can rest their feet while riding, thereby avoiding a cramped feeling during riding. When not in use, the foot pedals can be folded and placed upright. To prevent the foot pedals 20 in an upright state from being spread flatly, the limiting structures can be arranged to limit the rotation of the pedals 20.

To sum up, in the present disclosure, the steering structure 13 is arranged between the two steering wheels 11, and the steering structure 13 controls the rotation of the steering wheels 11. The steering structure 13 is capable of switching states between an unfolded state and a folded state to adapt to the folding of the foldable frame 10. Controlled in a simple, convenient and practical manner, this structure enables the steering wheels 11 to be replaced with straight-fork steering wheels, enhances the stability and safety of driving, and achieves simpler steering through a reasonable design. The present disclosure has a simple structure and is cost-effective.

The present disclosure is not limited merely to what is described in the specification and the implementation modes, such that additional advantages and modifications can be readily achieved by those skilled in the art. Without departing from the spirit and scope of the general concept as defined by the claims and the equivalents, the present disclosure is not limited to the specific details, representative apparatus, and illustrative examples as shown and described herein.

What is claimed is:

1. A foldable trailer steering system, comprising a foldable frame, wherein the foldable frame is a gathering frame; either side of a bottom of one end of the foldable frame is rotatably connected to a steering wheel respectively, a steering structure is arranged between the two steering wheels, and the steering structure can be vertically and foldably arranged for folding with the foldable frame; at least one end of the steering structure is rotatably connected to the corresponding steering wheel, and the steering structure is further connected to a steering rod assembly; one end of the foldable frame where the steering wheels are located is further rotatably connected to a support assembly, the support assembly is vertically folded with the foldable frame, the steering rod assembly is rotatably connected to the support assembly, and the steering rod assembly is capable of rotating vertically and horizontally relative to the support assembly; and the steering rod assembly controls the steering wheels to rotate horizontally through the steering structure, and when the foldable frame is folded, the support assembly drives the steering rod assembly to move vertically, and the steering rod assembly drives the steering structure to fold;

wherein the steering structure comprises a first connecting member, the first connecting member is rotatably connected to a swing steering arm, and the swing steering arm is fixedly connected to the steering rod assembly; and one end of the first connecting member away from one end of the swing steering arm is rotatably connected to a second connecting member, and the second connecting member is rotatably connected to the steering wheels.

2. The foldable trailer steering system according to claim 1, wherein the number of the steering structures is set as two, and the two steering structures are rotatably connected to the swing steering arms respectively.

3. The foldable trailer steering system according to claim 1, wherein one end of the second connecting member away from the first connecting member is rotatably connected to a third connecting member, and the third connecting member is rotatably connected to the corresponding steering wheels.

4. The foldable trailer steering system according to claim 2, wherein a distance from a lateral rotation axis of the steering rod assembly to a lateral rotation axis of the steering wheel on one side is defined as a first distance, and a distance from a connection point where the swing steering arm is connected to the corresponding first connecting member to a connection point where the steering wheel is connected to the corresponding second connecting member is defined as a second distance; and the first distance is greater than or less than the second distance.

5. The foldable trailer steering system according to claim 1, wherein a wheel swing arm is arranged above a side of either of the steering wheels, and the wheel swing arm is configured for connecting with the steering structure.

6. The foldable trailer steering system according to claim 1, wherein the other end of the foldable frame is provided with fixed wheels, the fixed wheels and/or the steering wheels are electrically driven to operate, and the steering rod assembly is capable of controlling the operation of the fixed wheels and/or the steering wheels; and the foldable frame is further provided with a power supply for providing power to the fixed wheels and/or the steering wheels and a controller, and the fixed wheels and/or the steering wheels are electrically connected to the controller.

7. The foldable trailer steering system according to claim 1, wherein one end of the foldable frame where the steering rod assembly is located is further provided with a pin-fixed clamping device configured for limiting the vertical rotation of the steering rod assembly.

8. The foldable trailer steering system according to claim 1, wherein the steering rod assembly comprises a steering handle, the steering handle is capable of rotating vertically, and the steering handle can be in limiting fit with the steering rod assembly to limit the vertical rotation of the steering handle.

9. The foldable trailer steering system according to claim 1, wherein a rotation limiting device for limiting the vertical rotation of the steering rod assembly is arranged on the steering rod assembly.

10. The foldable trailer steering system according to claim 8, wherein an accelerating device and a braking device are arranged on the steering handle.

11. The foldable trailer steering system according to claim 1, wherein wheel limiting structures that are in inserted fit with each other are arranged on opposite sides of the two steering wheels respectively, and the wheel limiting structures are configured for limiting the horizontal rotation of the steering wheels after the foldable frame is folded.

12. The foldable trailer steering system according to claim 11, wherein either of the wheel limiting structure comprises a limiting member and an inserting member, wherein the limiting member is arranged on one of the steering wheels, the inserting member is arranged on the other steering wheel, and the limiting member is opposite to the inserting member.

13. The foldable trailer steering system according to claim 12, wherein one end of the limiting member is shaped like a horn.

14. The foldable trailer steering system according to claim 1, wherein one end of the foldable frame that is connected to the steering wheels is provided with limiting structures configured for limiting a maximum rotation angle of the steering wheels.

15. The foldable trailer steering system according to claim 1, wherein both sides of one end of the foldable frame where the steering rod assembly is located are further rotatably connected to pedals.

16. The foldable trailer steering system according to claim 1, wherein a seat device is further arranged on a top of one end of the foldable frame where the steering rod assembly is located.

17. The foldable trailer steering system according to claim 1, wherein the support assembly rotates on a vertical plane that is perpendicular to a length direction of the foldable frame and parallel to a width direction of the foldable frame.

18. The foldable trailer steering system according to claim 3, wherein a wheel swing arm is arranged above a side of either of the steering wheels, and the wheel swing arm is configured for connecting with the steering structure.

19. A foldable trailer steering system, comprising a foldable frame, wherein the foldable frame is a gathering frame; either side of a bottom of one end of the foldable frame is rotatably connected to a steering wheel respectively, a steering structure is arranged between the two steering wheels, and the steering structure can be vertically and foldably arranged for folding with the foldable frame; at least one end of the steering structure is rotatably connected to the corresponding steering wheel, and the steering structure is further connected to a steering rod assembly; one end of the foldable frame where the steering wheels are located is further rotatably connected to a support assembly, the support assembly is vertically folded with the foldable frame, the steering rod assembly is rotatably connected to the support assembly, and the steering rod assembly is capable of rotating vertically and horizontally relative to the support assembly; and the steering rod assembly controls the steering wheels to rotate horizontally through the steering structure, and when the foldable frame is folded, the support assembly drives the steering rod assembly to move vertically, and the steering rod assembly drives the steering structure to fold, wherein the support assembly comprises a first support rod, a second support rod, a support rod connecting member, and an adapter rod, wherein one end of the first support rod is rotatably connected to the support rod connecting member, and one end of the second support rod is rotatably connected to one end of the support rod connecting member away from the first support rod; one end of the first support rod and one end of the second support rod that are away from each other are rotatably connected to the foldable frame, the first support rod and the second support rod are capable of rotating vertically relative to the foldable frame, the adapter rod is rotatably connected to the support rod connecting member, and the adapter rod is capable of rotating horizontally relative to the support rod connecting member; and the steering rod assembly is rotatably connected to the adapter rod, and the steering rod assembly is capable of rotating vertically relative to the adapter rod.

* * * * *